Patented Jan. 12, 1937

2,067,873

UNITED STATES PATENT OFFICE 2,067,873

ALKALI METAL SALTS OF CHLOROETHANE SULPHONIC ACID

Edgar C. Britton and Ralph P. Perkins, Midland, Mich., assignors to The Dow Chemical Company, Midland, Mich., a corporation of Michigan No Drawing. Application September 21, 1934, Serial No. 744,910

6 Claims. (Cl. 260—159)

This invention relates to processes for the preparation of the alkali metal salts of chloroethane sulphonic acid.

We are aware that the alkali metal salts of chloroethane sulphonic acid have been prepared from ethylene dichloride and that the alkali metal salts of bromoethane sulphonic acid have been prepared from ethylene dibromide. In trying to prepare the alkali metal salts of chloroethane sulphonic acid from ethylene chlorobromide, it was anticipated that a mixture of the chloroethane and bromoethane sulphonic acid salts might be obtained. We were surprised, however, to discover that the chlorine goes to the sulphonic acid salt and the bromine to the alkali metal salt, that the separation is clean-cut, and that the yields are decidedly better than we have obtained using ethylene dichloride. We have, accordingly, discovered that the alkali metal salts of chloroethane sulphonic acid can be prepared in excellent yields from ethylene chlorobromide.

Our procedure for making these salts includes the steps of refluxing together an aqueous solution of the alkali metal sulphite and ethylene chlorobromide in the presence of a copper catalyst such as metallic copper, but preferably cuprous chloride. The reaction mixture is then distilled, the water solution evaporated to dryness, the residue extracted with hot methyl alcohol, and the alcohol evaporated to obtain the alkali metal chloroethane sulphonate.

As a specific example, we have prepared sodium chloroethane sulphonate in the following manner.

Example 1

A solution of 100 grams (0.79 mole) of sodium sulphite in 450 milliliters of water was added at a substantially uniform rate over a period of 50 minutes to a refluxing and vigorously stirred solution consisting of 200 milliliters of water, 357 grams (2.5 moles) of ethylene chlorobromide, and 0.5 gram of cuprous chloride. The reaction mixture was then refluxed and stirred for 100 minutes after the addition of the aqueous sodium sulphite solution was completed, then cooled and filtered. The unreacted chlorobromide was distilled off and the water solution evaporated to dryness. The residue was extracted with hot methyl alcohol and the alcohol extract then evaporated to dryness. In this manner we obtained 116 grams of sodium chloroethane sulphonate, a yield of 88 per cent of the theoretical.

In a similar manner we have prepared the potassium salt.

Example 2

A solution of 156.3 grams of potassium sulphite in 400 milliliters of water was added at a substantially uniform rate over a period of 55 minutes to a refluxing and vigorously stirred mixture consisting of 200 milliliters of water, 357 grams of ethylene chlorobromide and 0.5 gram of cuprous chloride. The reaction mixture was then refluxed and stirred for 1 hour after the addition of the aqueous potassium sulphite solution was completed. The water and excess ethylene chlorobromide were then removed by distillation, the residue was dried under reduced pressure, and repeatedly extracted with about 500 milliliters of boiling methyl alcohol. The alcoholic extract was then cooled to room temperature during which time potassium chloroethane sulphonate crystallized therefrom. The crystals were filtered from the alcohol, dried, and weighed. The yield was 114.0 grams, or 77.8 per cent of theoretical.

It is apparent from the foregoing that our method for preparing the alkali metal salts of chloroethane sulphonic acid provides a facile and economical method of obtaining the salts in excellent yields.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method for the preparation of the alkali metal salts of chloroethane sulphonic acid, the step which consists in introducing an alkali metal sulphite gradually into an excess of hot ethylene chlorobromide.

2. In a method for the preparation of the alkali metal salts of chloroethane sulphonic acid, the step which consists in introducing an alkali metal sulphite gradually into an excess of hot ethylene chlorobromide in the presence of a copper catalyst.

3. In a method for the preparation of the alkali metal salts of chloroethane sulphonic acid, the steps which consist in introducing an alkali metal sulphite gradually into an excess of hot ethylene chlorobromide and refluxing the mixture in the presence of a copper catalyst.

4. In a method for the preparation of the alkali metal salts of chloroethane sulphonic acid, the steps which consist in introducing an alkali metal sulphite gradually into an excess of hot ethylene chlorobromide, refluxing the reaction mixture in the presence of a copper catalyst, distilling the reaction mixture to remove ethylene chlorobromide, evaporating the water solution to dryness, extracting the residue with hot methyl alcohol, and evaporating the alcohol to obtain the alkali metal chloroethane sulphonate.

5. In a method for the preparation of the sodium salts of chloroethane sulphonic acid, the step which consists in introducing sodium sulphite gradually into an excess of hot ethylene chlorobromide.

6. In a method for the preparation of the sodium salt of chloroethane sulphonic acid, the steps which consist in introducing sodium sulphite gradually into an excess of hot ethylene chlorobromide and refluxing the mixture in the presence of a copper catalyst.

EDGAR C. BRITTON.
RALPH P. PERKINS.